United States Patent
Yang

(10) Patent No.: US 6,763,074 B1
(45) Date of Patent: Jul. 13, 2004

(54) ADAPTIVE CONFIGURABLE DEMODULATION SYSTEM WITH MULTIPLE OPERATING MODES

(75) Inventor: Ganning Yang, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 672 days.

(21) Appl. No.: 09/710,764

(22) Filed: Nov. 8, 2000

(51) Int. Cl.[7] .............................................. H03D 3/18
(52) U.S. Cl. ..................... 375/328; 375/341; 375/324; 375/232
(58) Field of Search ................................. 375/232, 328, 375/350, 324, 340, 341; 329/316, 318; 455/214, 143

(56) References Cited

U.S. PATENT DOCUMENTS 5,159,282 A * 10/1992 Serizawa et al. ........... 329/316
5,291,524 A * 3/1994 Itakura et al. .............. 375/341
6,408,023 B1 * 6/2002 Abdesselem et al. ....... 375/232

* cited by examiner

Primary Examiner—Phoung Phu
(74) Attorney, Agent, or Firm—Mintz Levin Cohn Ferris Glovsky & Popeo, P.C.

(57) ABSTRACT

A demodulation system capable of configuring itself responsive to channel conditions. A plurality of detectors may be provided, one or more of which may be better able to handle a particular form of interference than one or more of the other detectors. The detectors estimate source bits from a common signal. One or more signal quality estimators receive the estimated bits for the detectors, and provide performance metrics for each of the detectors. A selector selects or continues the pre-selection of one of the detectors responsive to the performance metrics. A multiplexor outputs the estimated bits from the selected or pre-selected detector.

27 Claims, 16 Drawing Sheets

ADAPTIVE CONFIGURABLE DEMODULATION SYSTEM WITH MULTIPLE OPERATING MODES

BACKGROUND OF THE INVENTION

1. Field of the Invention

This invention relates generally to demodulation systems, and, more specifically, to GFSK or GMSK demodulation systems configurable in response to channel conditions.

2. Related Art

Current GFSK (Gauisian Frequency Shift Keying) or GMSK (Gauisian Minimum Shift Keying) demodulators are collectively used widely in various wireless communications systems including, for example, Bluetooth, Wireless LAN, Home RF, DECT, and GSM cellular systems. Since GMSK demodulators are a subset of GFSK demodulators, for purposes of this disclosure, these two will be referred to collectively as GFSK demodulators.

In these applications, such demodulators are subject to diverse forms of interference, including, without limitation, Adjacent Channel Interference (ACI), Co-Channel Interference (CCI), and Inter-Symbol Interference (ISI). Unfortunately, conventional demodulators are not adept at simultaneously rejecting all forms of interference.

Various additions have been made to differential demodulators in an attempt to deal with this problem, including Decision Feedback Equalizers (DFE) and Maximum Likelihood Sequential Estimators (MLSE) receivers. However, such additions tend to be complex and expensive, and therefore unsuitable for mass market devices.

SUMMARY

The invention provides a GFSK demodulation system where a baseband signal is input into a plurality of detectors. At least one of the detectors may be configured to better handle a particular form of interference than one or more of the other detectors. For example, one of the detectors may be a differential phase detector adept at rejecting ACI, while another may be an FM detector adept at rejecting CCI. In another example, two of the detectors may be differential phase detectors configured to determine phase differences over different time periods. The time periods may be selected so that at least one of the detectors is better able to handle a form of interference than the other detector.

The outputs of the detectors may be soft estimates which are input in parallel to corresponding signal quality estimators and the parallel data inputs of a multiplexor. Each signal quality estimator may provide a performance metric for the output of the corresponding detector. Each performance metric provides a measure of the quality of the corresponding output from the detector. The performance metrics are provided to the selector over one or more signal lines. Responsive to the one or more performance metrics, the selector selects, or continues the pre-selection of, one of the detectors. A multiplexor then outputs the estimated bits from the selected or pre-selected detector. The output of the multiplexor may be input to a decision module. The decision module may compare the output of the multiplexor with a threshold, and based on this comparison, provide hard estimates of the source bits.

One of the detectors may be pre-selected, such that the output of this detector at least initially appears at the output of the multiplexor. During a prescribed time period, the signal quality estimators may provide to the selector performance metrics for each of these detectors. Responsive to these performance metrics, the selector may then select another detector for output at the multiplexor. Alternatively, the selector may simply continue the preselection of the default detector.

Alternately, none of the detectors may be preselected. During a prescribed time period, the signal quality estimators may provide to the selector performance metrics for one or more of the detectors. Responsive to these performance metrics, the selector may then select one of the detectors for output at the multiplexor.

The invention also provides a second embodiment of a GFSK demodulation system where a signal is input to a detector which has a plurality of possible operating modes, and which is configurable to operate in accordance with a particular mode selected or pre-selected by the selector. At least one of the possible modes may be better able than one or more of the other modes to handle a particular form of interference.

For example, the detector may be a differential phase detector where the delay between successive phase samples (hereinafter, the "sampling delay") used to compute $\Delta\theta$ is configurable responsive to the mode which is selected or pre-selected by the selector. The detector may initially utilize a default sampling delay. However, after a prescribed time period, the selector may select a different sampling delay.

The invention also provides a third embodiment of a GFSK demodulation system which is a combination of the foregoing two embodiments. In particular, a signal may be input to first and second detectors. One of the detectors is selected or pre-selected for output at the multiplexor. In addition, the selected detector has a plurality of possible operating modes, one of which is selected or pre-selected. The detector is then configured to operate in accordance with the selected or pre-selected mode of operation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
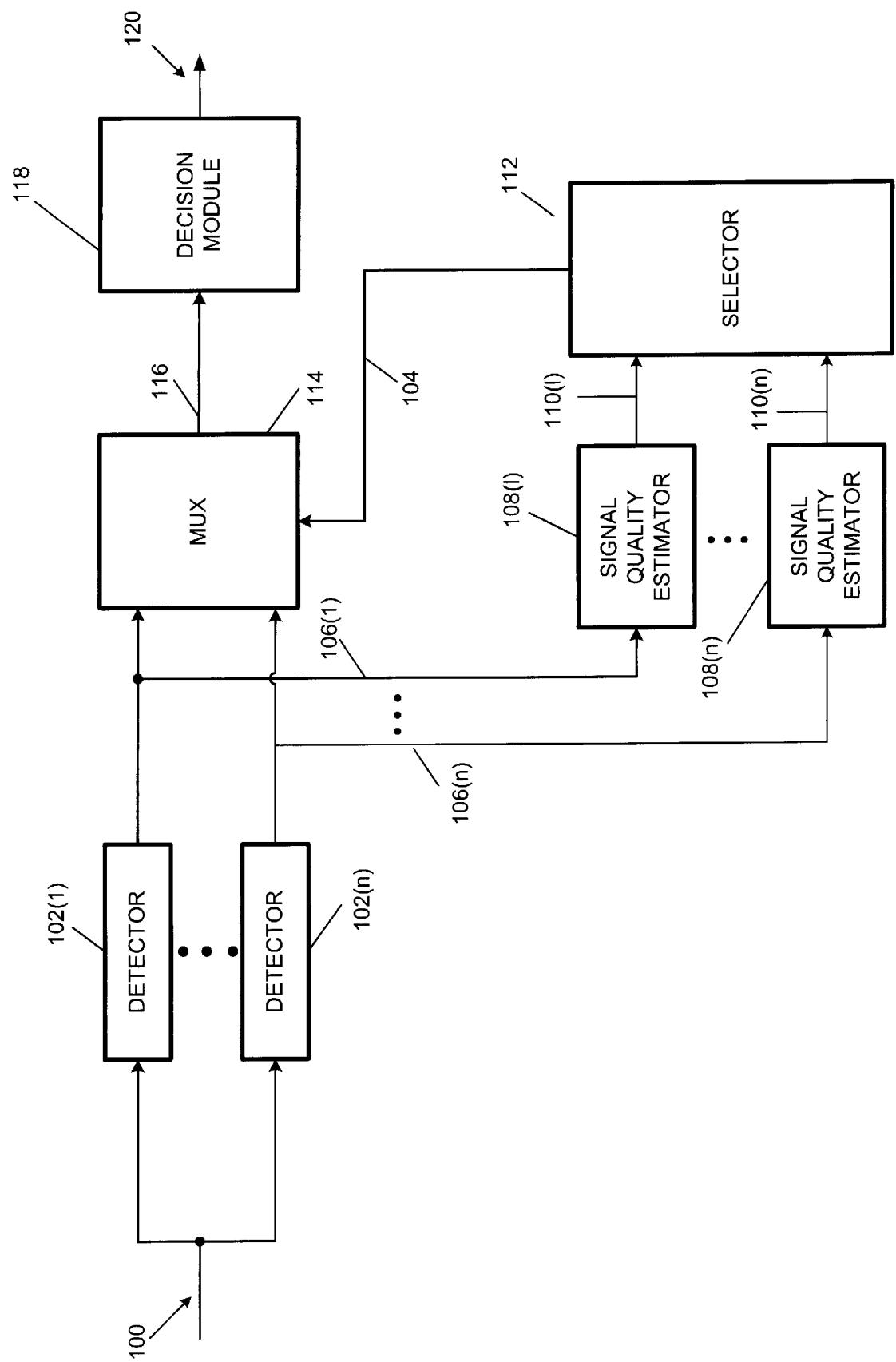
FIG. 1 is a block diagram of a first embodiment of a demodulation system according to the invention.

A first embodiment of a GFSK demodulation system in accordance with the invention is illustrated in FIG. 1. As illustrated, a baseband signal 100 is input into a plurality of detectors 102(1), 102(n). For ease of illustration, only two such detectors are expressly shown in FIG. 1, but it should be appreciated that this embodiment covers the case where an arbitrary number n of detectors is included, n being an integer greater than or equal to 1.

At least one of the detectors 102(1), 102(n) may be configured to better handle a particular form of interference than one or more of the other detectors. For example, one of the detectors may be a differential phase detector adept at rejecting ACI, while another may be an FM detector adept at rejecting CCI. In another example, two of the detectors may be differential phase detectors configured to utilize different delays between successive phase samples. The delays may be selected so that at least one of the detectors is better able to handle a form of interference than the other detector.

Each of the detectors 102(1), 102(n) functions to detect the information in the baseband signal 100, and output a signal embodying that information. The outputs 106(1), 106(n) of the detectors are coupled in parallel to corresponding signal quality estimators 108(1), 108(n) and to the parallel data inputs of multiplexor 114. The signal quality estimators 108(1), 108(n) may provide performance metrics for the outputs of the detectors. Each performance metric provides a measure of the quality of the corresponding detector output. The performance metric for a signal may be based on a relative comparison between the signal and other signals output from the one or more detectors, or it may be an absolute measurement based on a comparison of the signal to an absolute standard. The performance metric for a signal may even change over time or responsive to channel conditions.

The performance metrics are provided to selector 112 over signal lines 110(1), 110(n). Responsive to one or more of the performance metrics, the selector 112 may set the state of one or more signal lines 104. These signal lines are coupled to a control input of multiplexor 114. Responsive to the setting of this control input, the multiplexor 114 routes one of the detector outputs to its output 116.

One the detectors 102(1), 102(n) may initially be preselected for output by selector 112. During a prescribed time period, the signal quality estimators 108(1), 108(n) may provide to the selector 112 performance metrics for the one or more detectors. Responsive to these performance metrics, the selector 112 may select another detector for output at the multiplexor. Alternatively, the selector 112 may simply confirm the pre-selection of a default detector.

Alternately, none of the detectors 102(1), 102(n) may be pre-selected. During a prescribed time period, the signal quality estimators 108(1), 108(n) may provide to the selector 112 performance metrics for the one or more detectors. Responsive to these performance metrics, the selector 112 may then select one of the detectors for output at the multiplexor.

The outputs of the detectors 102(1), 102(n) may be soft estimates of the underlying source bits. In this case, a decision module 118 may be provided. Decision module 118 may receive, as an input, the output 116 of multiplexor 114. Responsive thereto, module 118 produces hard estimates of the underlying source bits, and outputs them on signal line 120. In one implementation, decision module 118 produces hard estimates by comparing the soft estimates with a predetermined threshold. The decision module 118 may be synchronized with the rest of the detector to ensure this comparison is performed at the appropriate time. In one example, if a soft estimate is equal to or above the threshold, the underlying information bit may be estimated to be a 1, and if the soft estimate is less than or equal to the threshold, the underlying information bit may be estimated to be a 0. One of ordinary skill will appreciate from a reading of this disclosure that other detection criteria are possible, including estimating the source bit to be a 0 if the soft estimate exceeds the threshold, and estimating the bit to be a 1 if the soft estimate is less than or equal to the threshold.

Of course, it should be appreciated that embodiments are possible in which hard estimates are directly provided by detectors 102(1), 102(n). In this event, decision module 118 would be unnecessary, and could be eliminated.

Figure 2:
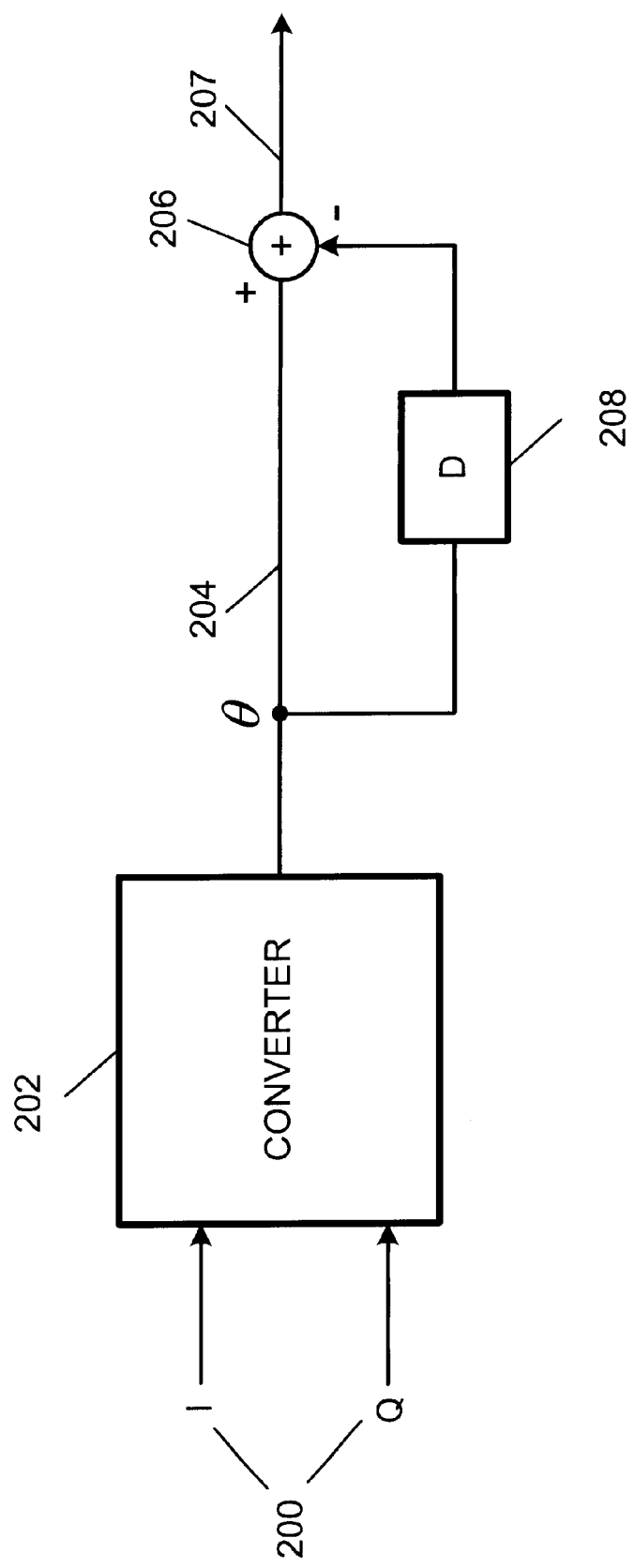
FIG. 2 is a block diagram of a differential phase detector.

FIG. 2 illustrates an example implementation of a differential phase detector. A quadrature baseband signal 200 is input to converter 202. The converter 202 converts the I and Q components of the baseband signal 200 into the theta domain. This process may occur by taking the angle θ to be the inverse tangent of the ratio of $$\theta = \tan^{-1}\left(\frac{Q}{I}\right)$$

The output 204 of the converter 202 is then input to a delay element D, identified with numeral 208 in the figure. The output of the delay element 208 is a delayed form of the output 204 of the converter. The amount of the delay introduced by element 208 may be a fraction of the symbol period T. The output of the delay element is subtracted from the output 204 of the converter through summing junction 206. The difference AO forms a soft estimate which is output over signal line 207.

The differential phase detector may be a 1 bit differential phase detector. In this case, the delay between successive samples of θ (hereinafter the "sampling delay") is the symbol duration T. Consequently, the detector estimates a source bit every symbol duration T. It may also be a fractional bit differential phase detector, such as a 0.25 bit differential phase detector. In this case, the delay between successive samples of θ is 0.25 T. Consequently, in this example, the detector estimates a source bit four times in every symbol period. One of ordinary skill in the art will appreciate from a reading of this disclosure that other examples are possible simply by varying the delay which occurs between successive samples of θ.

Figure 3:
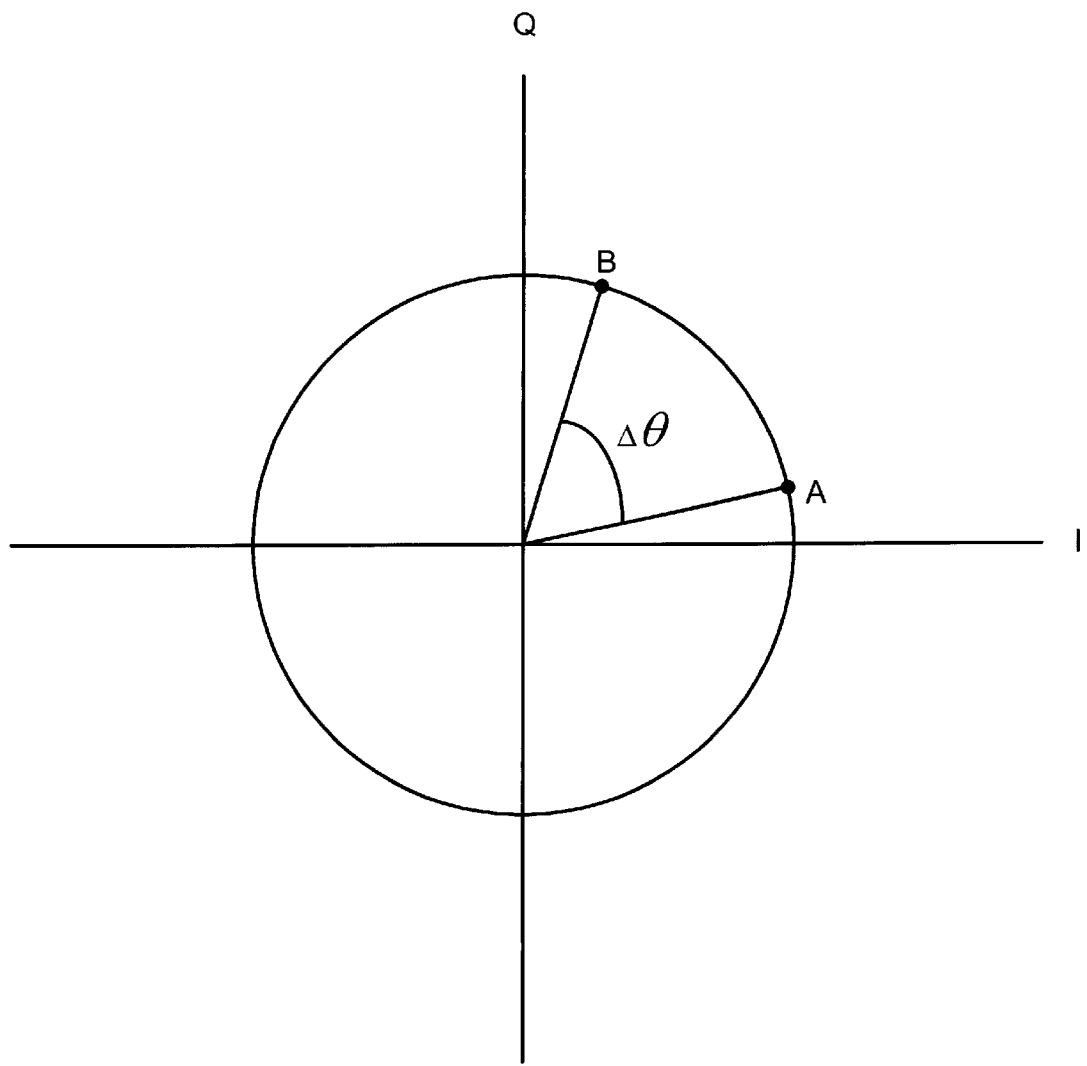
FIG. 3 is a phase diagram illustrating operation of the differential phase detector of FIG. 2.

FIG. 3 is a diagram illustrating operation of a differential phase detector in the theta domain. As illustrated, successive samples of theta may switch back and forth from A to B and vice versa. The magnitude of the change in theta between these two positions is Δθ. In general, the maximum value of Δθ for a differential phase detector depends on the delay between successive samples. The greater the delay, the greater the maximum value of Δθ, and vice-versa.

If the sampling delay is large compared to the symbol period, the differential phase detector will generally be relatively immune to ACI, but vulnerable to CCI and ISI. The immunity to ACI is because ACI, being out of band, is essentially high frequency noise, and high frequency noise will not dramatically affect the operation of the differential phase detector when the sampling delay is large. This can be seen in FIG. 3, where the introduction of high frequency noise will manifest itself in the form of low amplitude, high frequency oscillations around the points A and B. These high frequency oscillations, being low magnitude, will not generally be large enough to introduce errors, such as could occur if theta while at point A would appear to be at point B, or theta while at point B would appear to be at point A.

Figure 4:
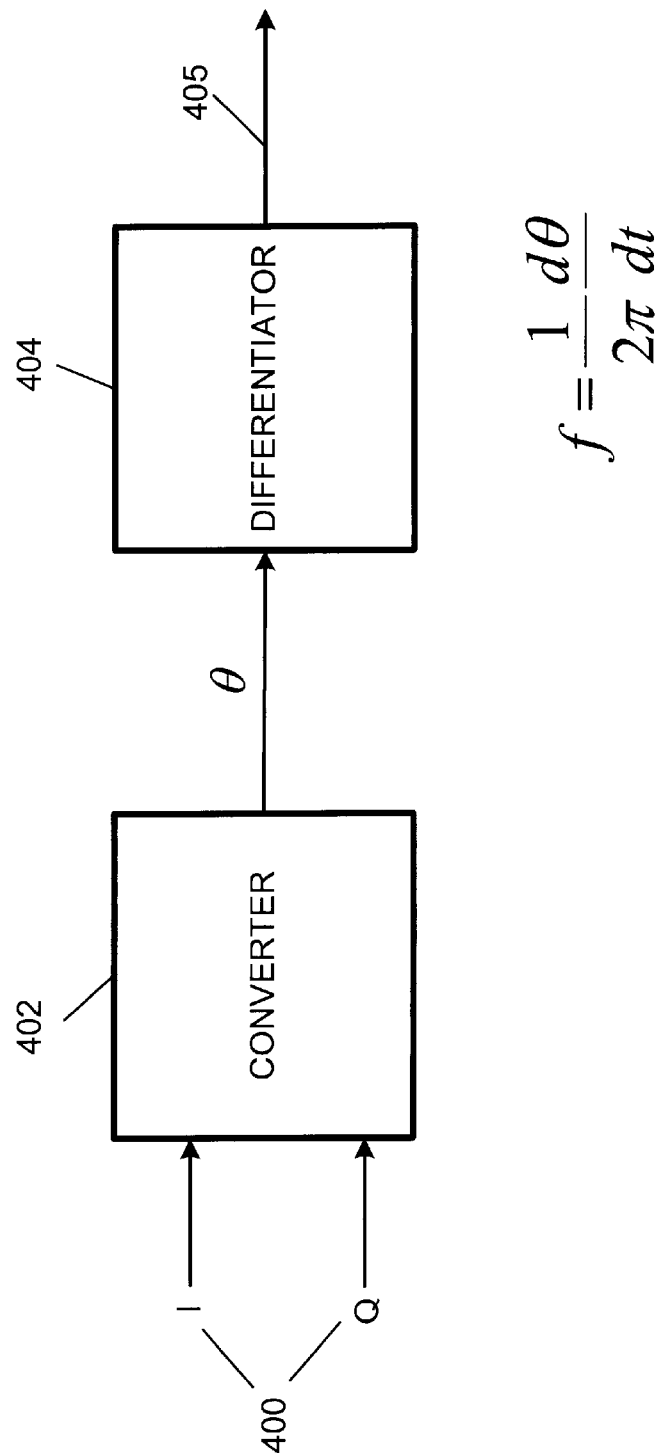
FIG. 4 is a block diagram of a FM detector.

FIG. 4 illustrates an example implementation of an FM detector. A quadrature baseband signal 400 is input to converter 402. The converter 402 converts the I and Q components of the baseband signal 400 into the theta domain. This process may occur by taking the angle θ to be the inverse tangent of the ratio of Q to as follows:

$$\theta = \tan^{-1}\left(\frac{Q}{I}\right)$$

The output of the converter 402 is then input to differentiator 404. Differentiator 404 differentiates the output of the converter to produce a frequency f as follows:

$$f = \frac{1}{2\pi} \cdot \frac{d\theta}{dt}$$

A signal 405 embodying this frequency is output from differentiator 404.

In a digital implementation, the operation of differentiator 404 may be expressed as:

$$f = \frac{1}{2\pi} \cdot \frac{\theta(n) - \theta(n-1)}{t(n) - t(n-1)}$$

where the time difference t(n)−t(n−1) is a small fraction of the symbol duration T. If t(n)−t(n−1) is made infinitely small, the detector functions as a true FM detector. In an example implementation, the time difference t(n)−t(n−1) may be (0.125)×(T) or smaller. Since 2π, and t(n)−t(n−1) are constants, the above formula can be simplified to f=A(θ(n)− θ(n−1)) where A is a scaling factor. Ignoring this scaling factor, it can be seen that the operation of the FM detector in the digital domain is identical to that of the differential phase detector. Consequently, the FM detector can be viewed as a special case of the differential phase detector where the sampling delay is below a specified fraction of the symbol period.

Figure 5:
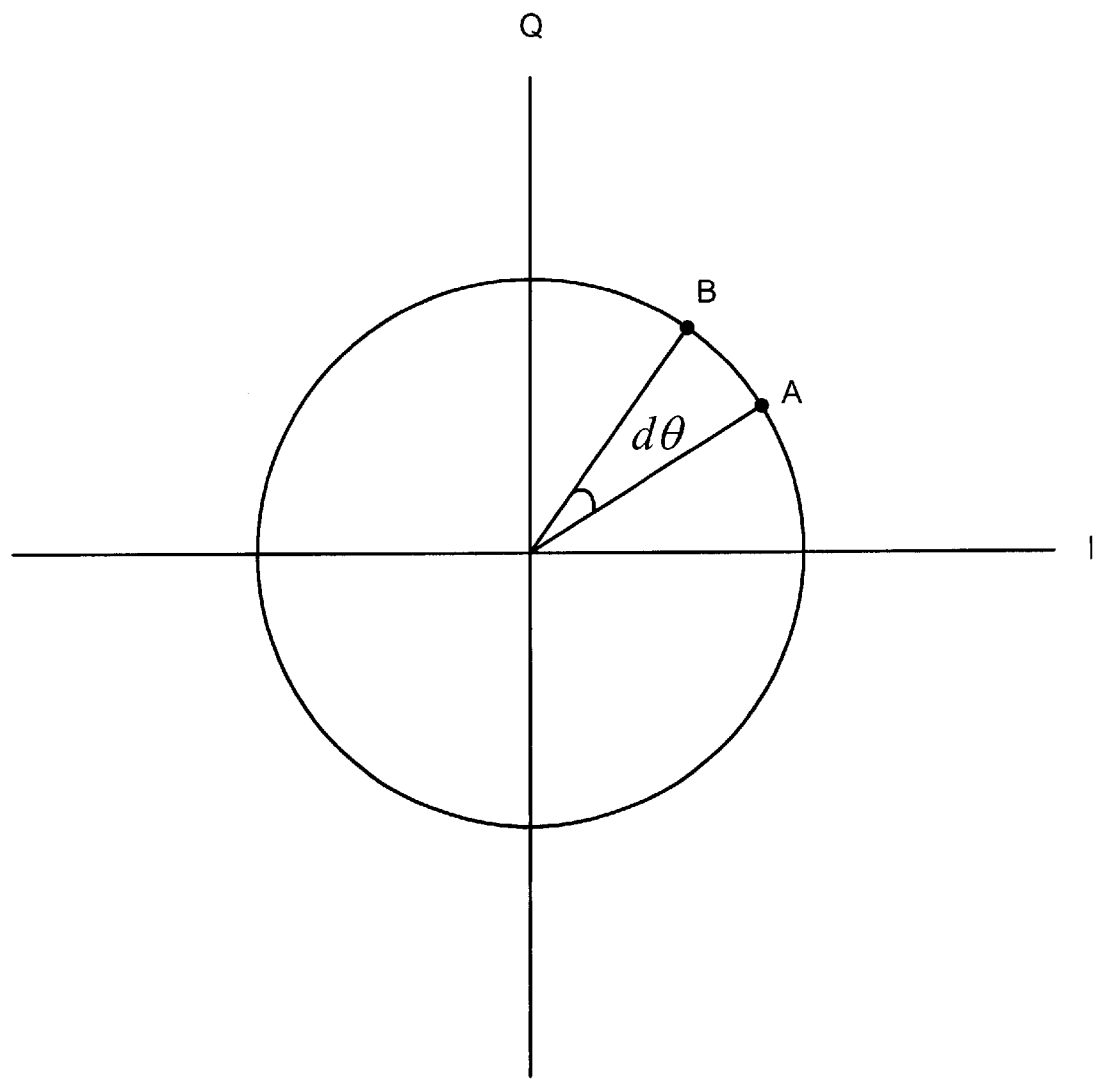
FIG. 5 is a phase diagram illustrating operation of the FM detector of FIG. 4.

FIG. 5 is a diagram illustrating operation of the FM detector in the theta domain. As illustrated, successive samples of theta may switch back and forth from A to B and vice versa. The magnitude of the maximum change in theta between these two positions is dθ. In general, the value of dθ for an FM detector varies in proportion to the sampling delay.

Because the sampling delay in the FM detector is relatively small, the FM detector will generally be relatively vulnerable to ACI, but immune to CCI and ISI. The vulnerability to ACI is because ACI, being out of band, is essentially high frequency noise, and high frequency noise, even if low magnitude, may materially affect the operation of the FM phase detector. This can be seen in FIG. 5, where the introduction of high frequency noise may manifest itself in the form of low amplitude, high frequency oscillations around the points A and B. These high frequency oscillations may be large enough to introduce errors, such as would occur if theta while at point A appeared to be at point B, or theta while at point B appeared to be at point A.

In one implementation of the embodiment of FIG. 1, one of the detectors is a differential phase detector, and the other is a FM detector. If the channel is subject to ACI, the system may select the differential phase detector in lieu of the FM detector. On the other hand, if the channel is subject to CCI or ISI, the system may select the FM detector in lieu of the differential phase detector. Consequently, from the standpoint of the system as a whole, a demodulation system is provided to simultaneously handle the problems of ACI, CCI, and ISI.

In a second implementation of the embodiment of FIG. 1, the detectors are differential phase detectors with different sampling delays. For example, one of the detectors may be a 1 bit differential phase detector, and the other may be a 0.25 bit differential phase detector.

Figure 6:
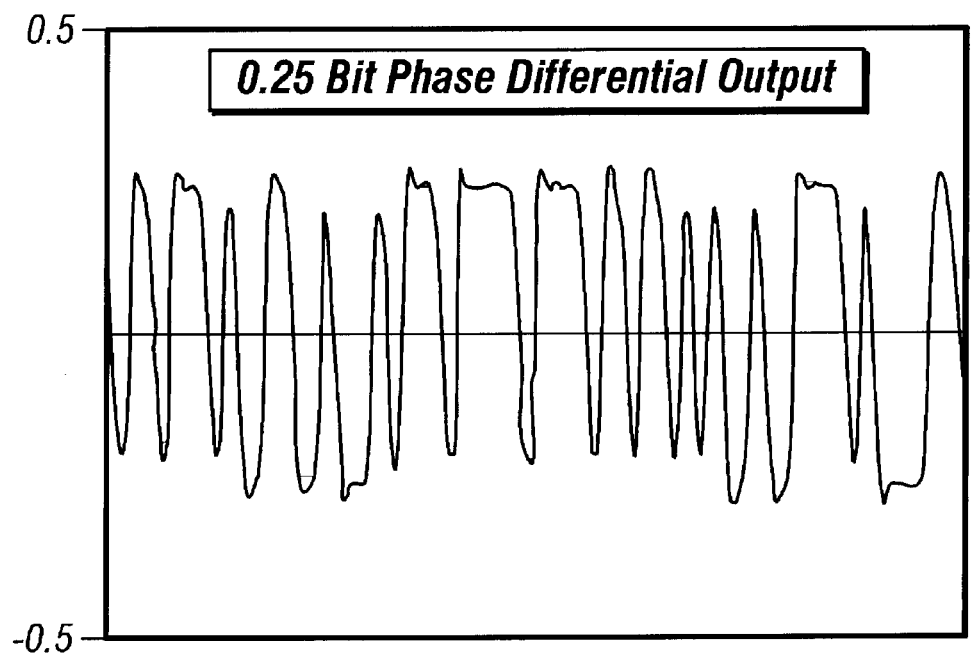
FIG. 6 is an example of the output of a 0.25 bit differential phase detector.
Figure 7:
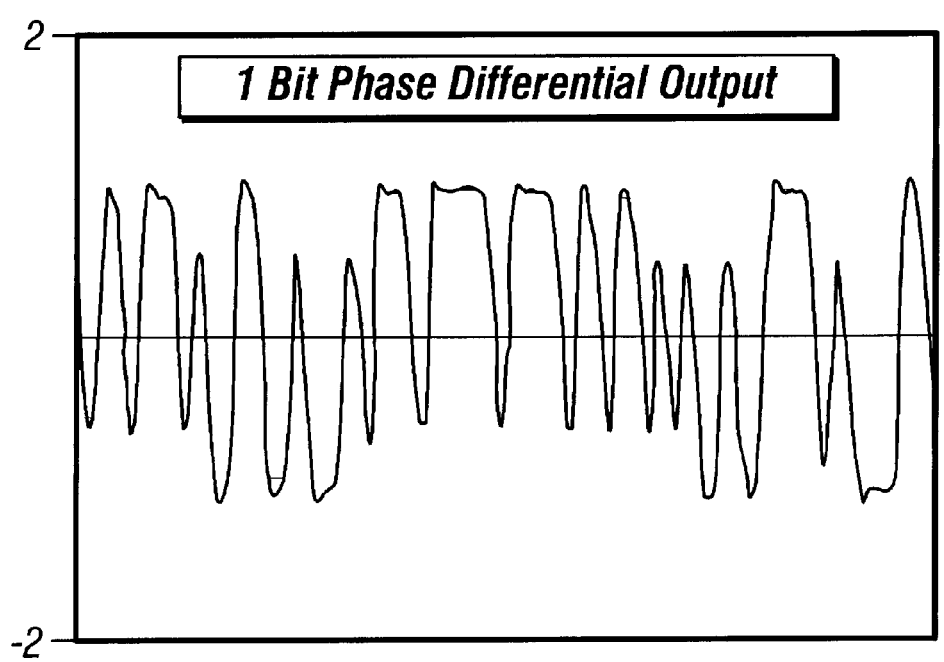
FIG. 7 is an example of the output of a 1 bit differential phase detector.

A plot of the signal 207 in one example of a 0.25 bit differential phase detector is illustrated in FIG. 6. FIG. 7 is a plot of the signal 207 in one example of a 1 bit differential phase detector. Both of these examples are consistent with GFSK modulation with a modulation index of 0.32 and BT=0.5, as may be used in Bluetooth applications.

Figure 8:
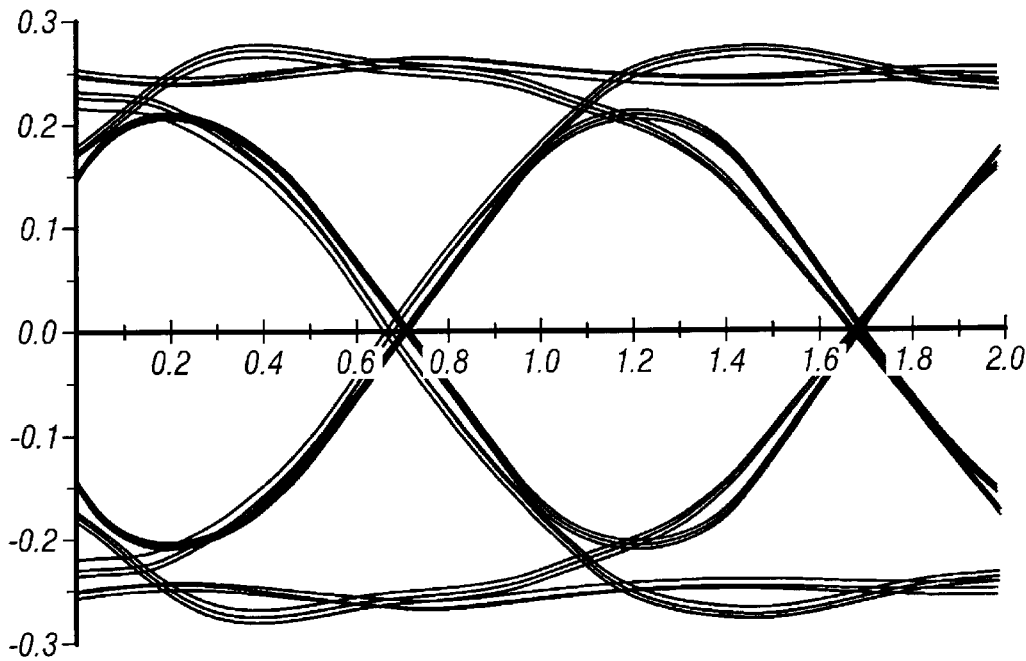
FIG. 8 is an example of an "eye diagram" for a 0.25 bit differential phase detector.
Figure 9:
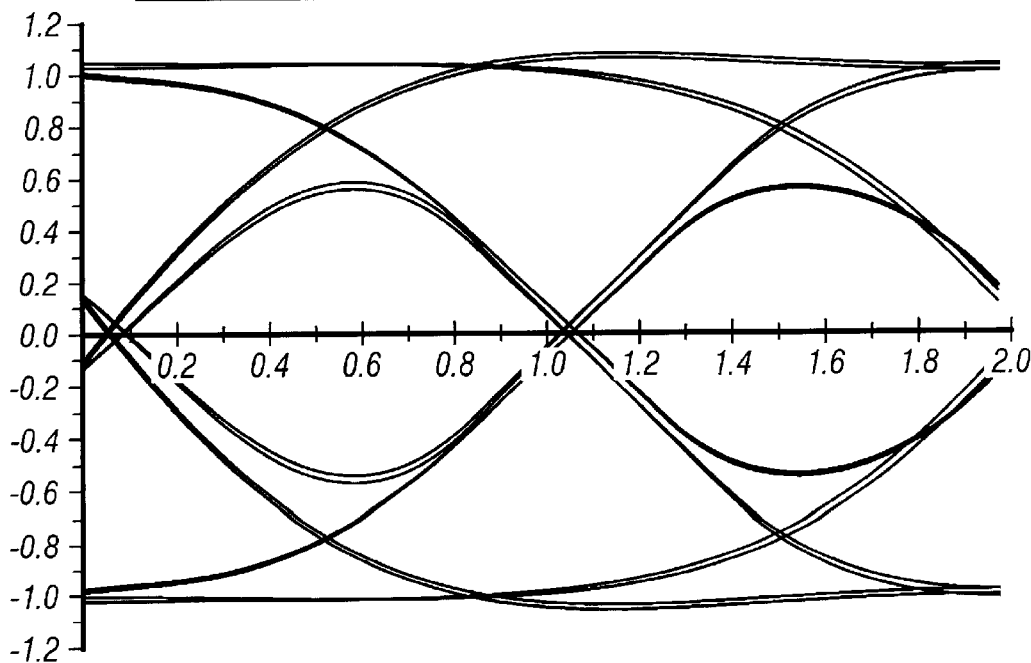
FIG. 9 is an example of an "eye diagram" for a 1 bit differential phase detector.

FIG. 8 is an "eye" diagram for an example of a 0.25 bit differential phase detector. It represents the result of stacking successive transitions of the type illustrated in FIG. 6 on top of one another. FIG. 9 is an "eye" diagram for an example of a 1 bit differential phase detector. It represents the result of stacking successive transitions of the type illustrated in FIG. 7 on top of one another. Comparing the two, it can be seen that the "eye" diagram of FIG. 8 is relatively more open than that of FIG. 9. This signifies that the 1 bit differential phase detector will generally be more vulnerable to CCI and ISI than the 0.25 bit differential phase detector.

Figure 19:
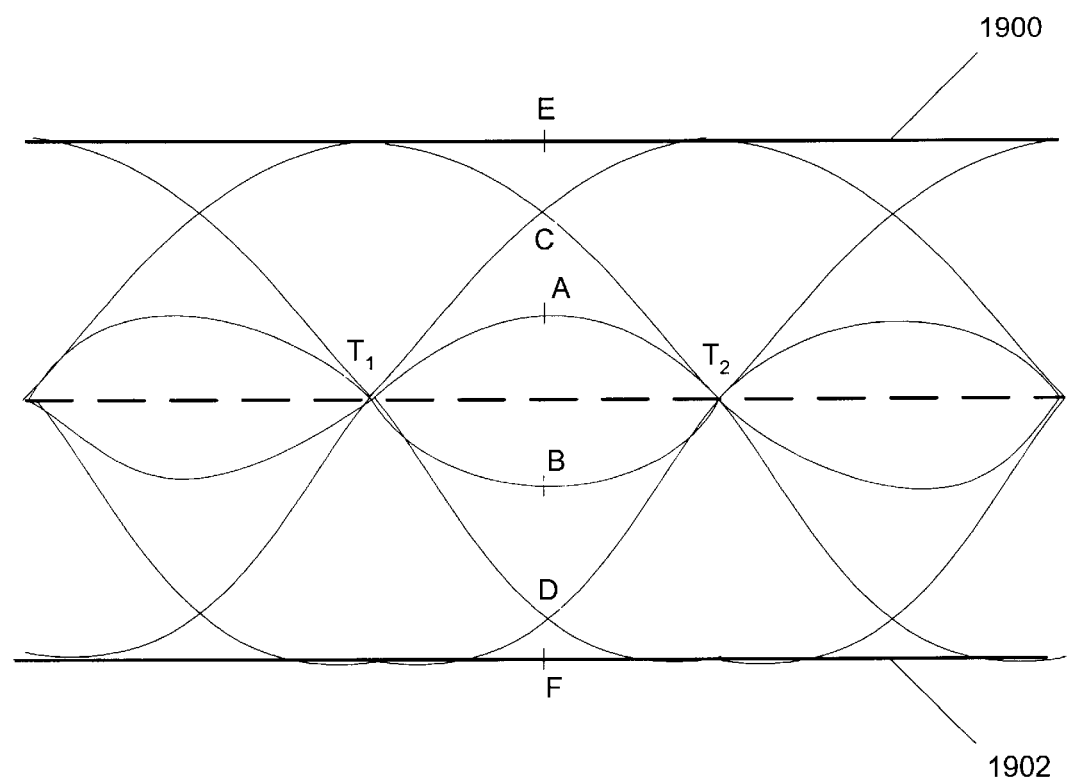
FIG. 19 is a representative example of an eye diagram.

The difference between these eye diagrams can be further explained by reference to FIG. 19. The lines 1900 and 1902 are the maximum eye open boundaries. When consecutive "1"s are transmitted, the line 1900 will result. When consecutive "0"s are transmitted, the line 1902 will result. Other curves will result from other data patterns. For example, "010" will result in $T_1AT_2$ in the figure; "101" will result in $T_1BT_2$ in the figure; "110" or "011" will result in a pattern which passes through point C; "100" or "001" will result in a pattern which passes through point D; "111" will result in a pattern which passes through point E; and "000" will result in a pattern which passes through point F.

From the above descriptions, it will be seen that the degree of eye opening depends on the data pattern, and that the "101" or "010" data patterns will cause the least eye opening, and therefore, be the most susceptible to noise or interference, such as ISI.

In an ideal case, points A, C and E become one point, and points B, D and F become one point. In this ideal case, the eye is open the maximum amount, and does not depend on data patterns. In this ideal case, no ISI ca exist.

In a non-ideal case, such as presented by FIGS. 6–9, the eye is not open the maximum amount, and the amount of opening depends on the response to the "101" or "010" data patterns.

In the case represented by FIG. 6, the maximum swing of the signal is about 80% of the theoretical maximum, while, for the case represented by FIG. 7, the maximum swing of the signal is about 50% of the theoretical maximum. Therefore, the "101" or "010" data patterns in the FIG. 6 case will result in a more open diagram than in the FIG. 7 case.

Note that it may be possible to improve the performance of the 1-bit differential phase detector with respect to CCI and ISI by decreasing the delay between successive samples of θ. A decrease in the sampling delay will generally open "eye" diagram more. A more open eye diagram generally signifies greater immunity to CCI and ISI.

Therefore, if the channel is subject to CCI or ISI, the system should select the 0.25bit differential phase detector. On the other hand, if the channel is not subject to CCI or ISI, but is subject to ACI, the system should select the 1 bit differential phase detector since it is more immune to ACI than is the 0.25 bit differential phase detector.

Figure 10:
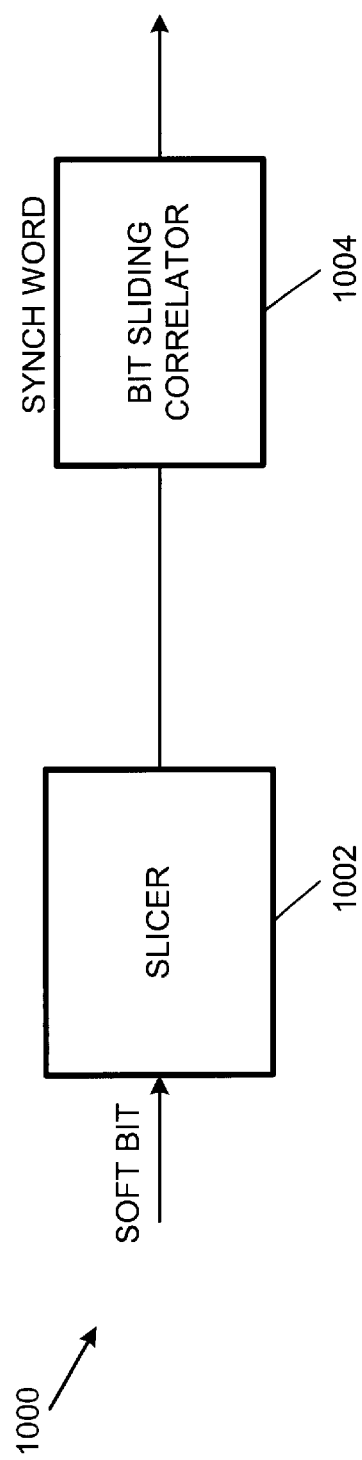
FIG. 10 is a block diagram of an implementation example of a signal quality estimator.

FIG. 10 illustrates one implementation example of signal quality estimator 108. In this example, slicer 1002 receives a signal embodying soft bit estimates 1000 and decimates the signal to a prescribed rate, such as 1 MHz. The decimated signal is output to a bit sliding correlator 1004. Bit sliding correlator 1004 correlates the signal against a known sync word and outputs a performance metric for the signal which may be the degree of correlation between the signal and the known sync word. Alternatively, the performance metric may be an indicator of whether or not the degree of correlation between the signal and the known sync word exceeds a predetermined threshold. One of ordinary skill in the art will appreciate from a reading of this disclosure that other forms of performance metrics are possible.

Figure 11:
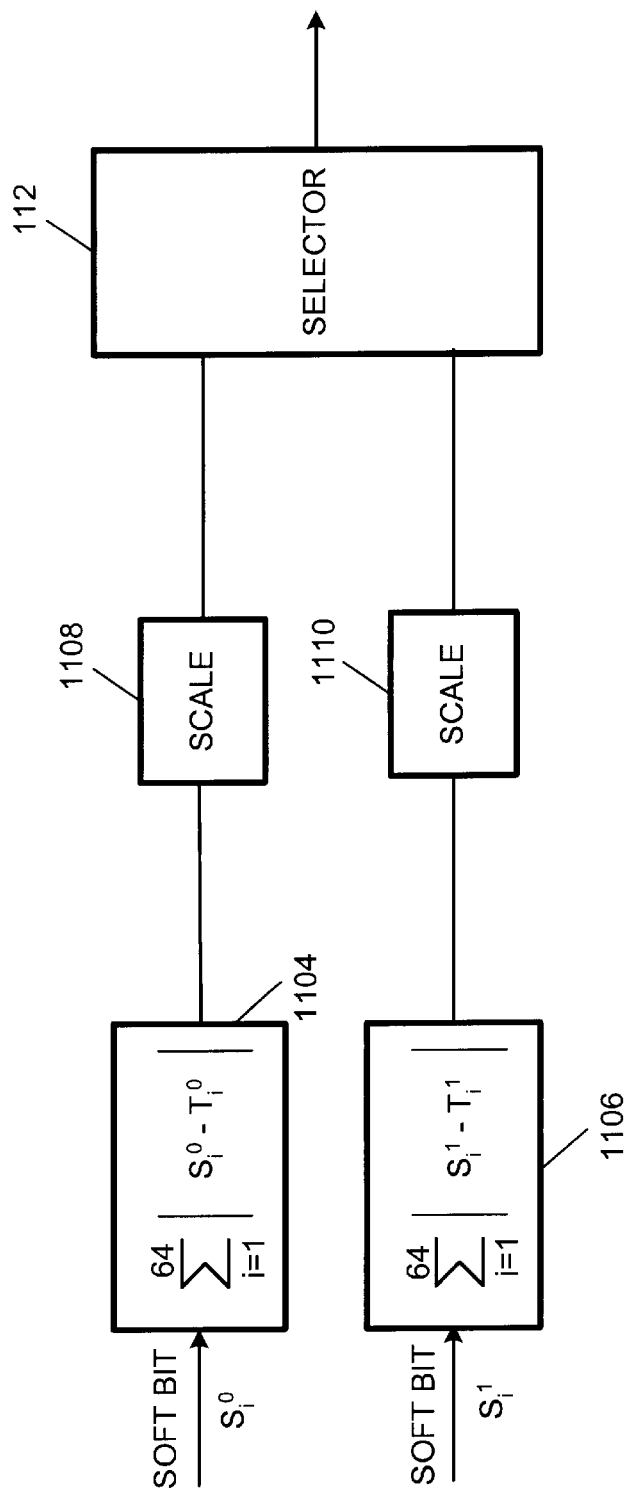
FIG. 11 is a block diagram of an implementation example of a signal quality estimation system configured for use in a Bluetooth environment.

FIG. 11 illustrates an implementation example of a signal quality estimation system configured for use in relation to the Bluetooth Wireless Technology Standard, otherwise known as "Bluetooth." Bluetooth is a computing and telecommunications industry specification that describes how mobile phones, home and business phones, computers, and PDAs (personal digital assistants) can easily interconnect with each other using a short-range wireless connection. Bluetooth is specifically designed to provide low-cost, robust, high-capacity voice and data networking. It features fast frequency hopping to avoid interference and short data packets to maximum capacity during interference.

Figure 12:
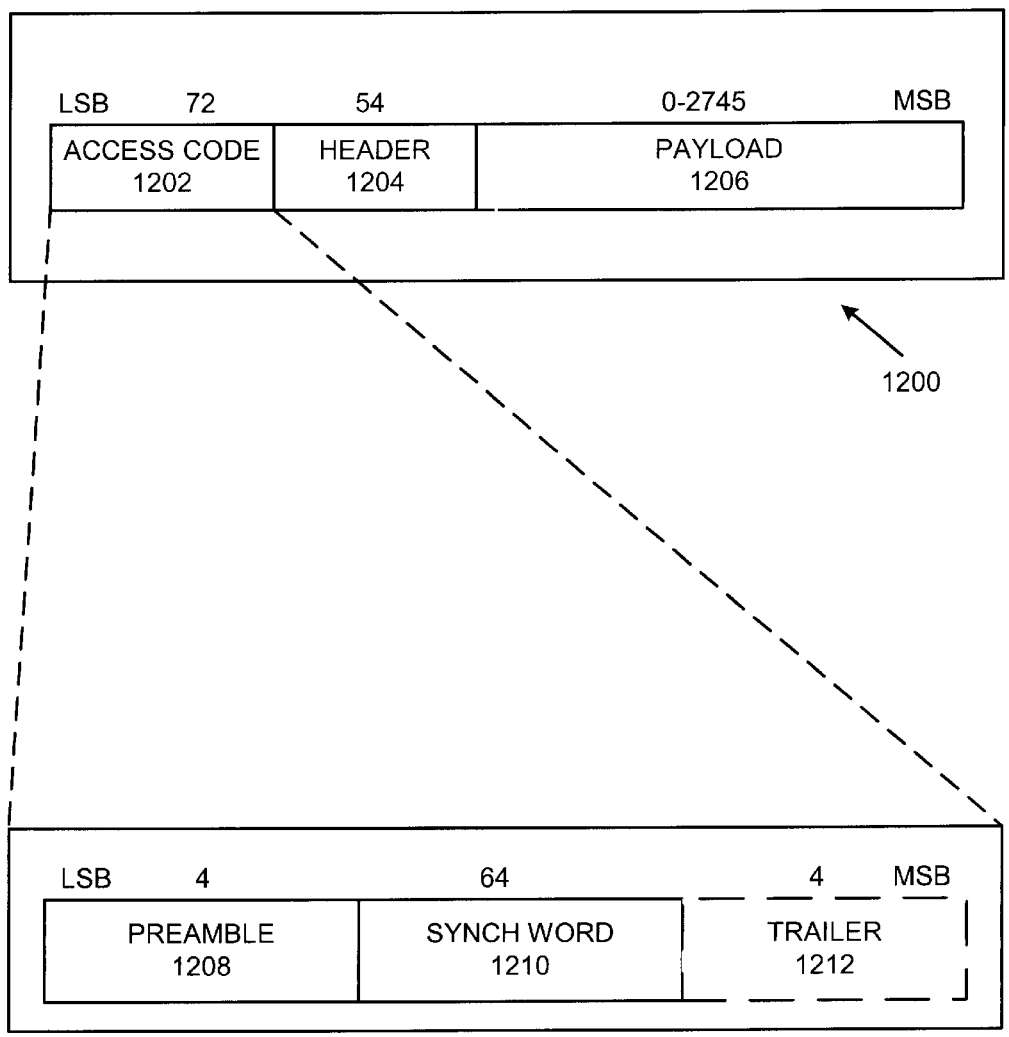
FIG. 12 illustrates example packet formats in an example Bluetooth environment.

In Bluetooth, information is conveyed in the form of packets. The format of a standard Bluetooth packet 1200 is illustrated in FIG. 12. The standard packet 1200 includes a 72-bit access code 1202, a 54-bit header 1204 and a payload 1206 of variable length ranging from zero to 2,745 bits. The 72-bit access code 1202 includes a 4-bit preamble 1208, a 64-bit sync word 1210, and a 4-bit trailer 1212. The 72-bit access code 1202 is generally used for synchronization, DC offset compensation and identification, such as between different senders.

Referring back to FIG. 11, soft bit estimates $S_i^0$ from the sync code portion of a packet may be provided to a first signal quality estimator 1104. The bits may be derived from a first detector(not shown). The bits may be correlated with a known 64-bit sync word $T_i^0$. The degree of correlation may be given by the expression $$\sum_{i=1}^{64} |S_i^0 - T_i^0|.$$

A signal representing the degree of correlation may be scaled by scaler 1108, and then input to selector 112.

Soft bit estimates $S_i^0$ from the sync code portion of the packet may be provided to a second signal quality estimator 1106. The bits may be derived from a second detector(not shown). The bits may be correlated with a known 64-bit sync word $T_i^0$. The degree of correlation may be given by the expression.

$$\sum_{i=1}^{64} |S_i^1 - T_i^1|.$$

A signal representing the degree of correlation may be scaled by scaler 1310, and then input to selector 112.

The signals representing the respective degrees of correlation may be compared by selector 112. Based on this comparison, the selector may select the detector which provides estimated bits that exhibit the highest degree of correlation with the known sync words. This detector may then be used to detect the remainder of the packet.

One of ordinary skill in the art will appreciate from a reading of this disclosure how the system of FIG. 11 could be employed with other packet-based systems, including frequency hopping, TDMA, and combined frequency hopping/TDMA systems.

Figure 13:
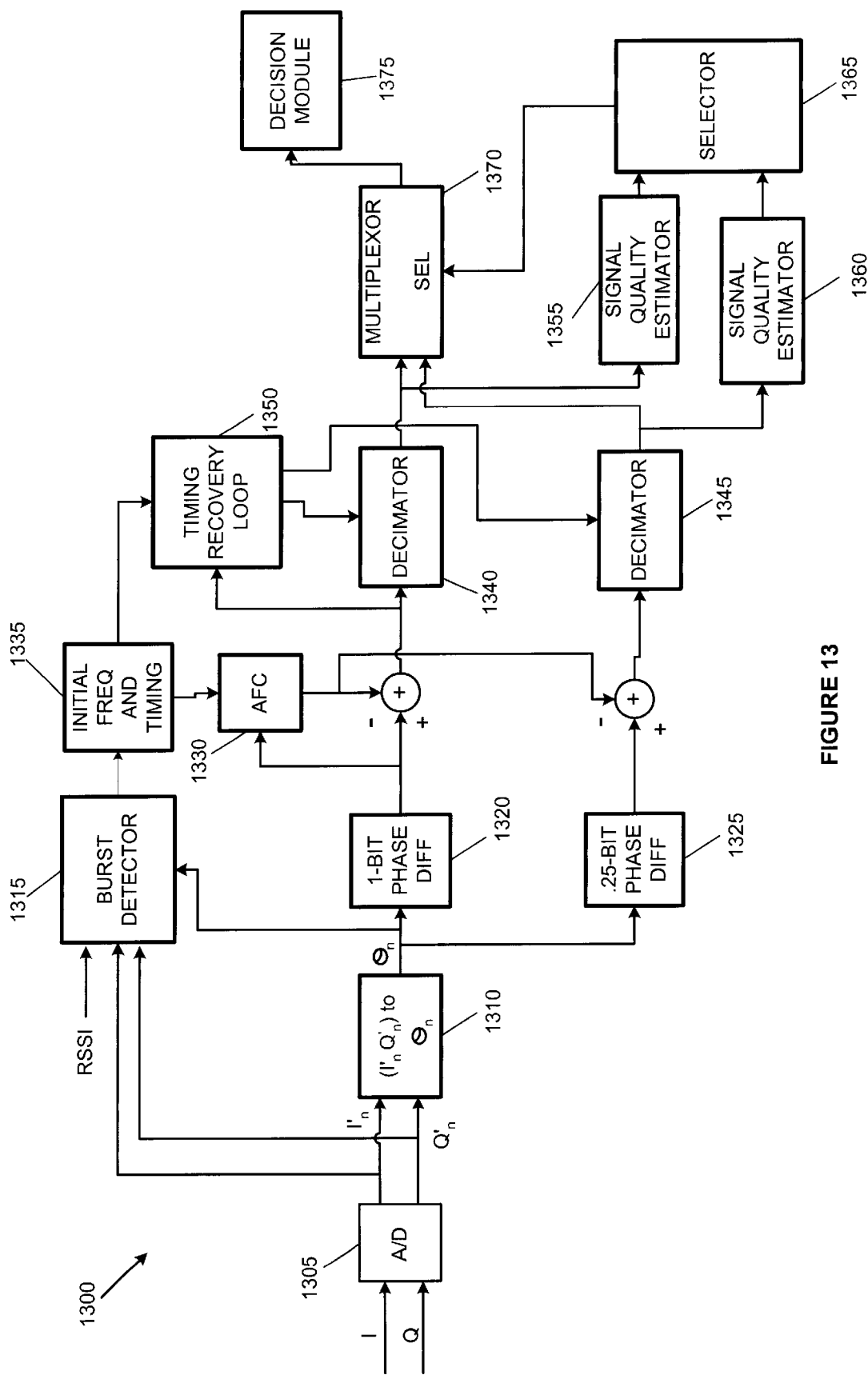
FIG. 13 is a block diagram of a demodulation system configured for use in a Bluetooth environment.

FIG. 13 illustrates an implementation example of a demodulation system 1300 adapted for use in a Bluetooth communications environment. The system 1300 includes an A/D converter 1305 for receiving I and Q domain signals and providing them to an I and Q domain to theta domain converter 1310 and a burst detector 1315. Converter 1310 converts the I and Q signals into the theta domain. The burst detector 1315 further receives the theta domain signal from the theta domain converter 1310. Preferably, burst detection by the burst detector 1315 occurs during reception of the 4-bit preamble of a packet, along with the initial frequency offset and timing estimation, as was discussed with respect to FIG. 12. The burst detector 1315 utilizes a received signal strength indication (RSSI) and a data pattern in the preamble to detect the burst. The theta domain signal from the theta domain converter 1310 is further provided to a plurality of selectable detectors, shown for illustrative purposes as a 1-bit phase differential phase detector 1320 and a 0.25-bit phase differential phase detector 1325. Once a burst is found, the burst detector 1315 triggers the initial frequency and timing estimation block 1335 to preset an initial estimated frequency offset to AFC block 1330, preset the system timing chain, and enable AFC 1330 and timing recovery loop 1350 for frequency and timing tracking during the burst. Again, numerous variations on the number and type of detectors provided are contemplated. Signals embodying estimated bits from the 1-bit differential phase detector 1320 and the 0.25-bit differential phase detector 1325 are thereafter provided to respective decimators 1340 and 1345. These output signals are also summed with a signal from an automatic frequency control(AFC) 1330 in response to an input signal from an initial frequency and timing determination portion 1335. Signal quality estimators 1355 and 1360 receive signals from the decimators 1340 and 1345 respectively. Based on signals received from the signal quality estimators 1355 and 1360, a selector 1365 controls a multiplexor 1370 to pass an appropriate one of the signals input to decision module 1375. Decision module 1375 provides hard estimates of the source bits.

Figure 14:
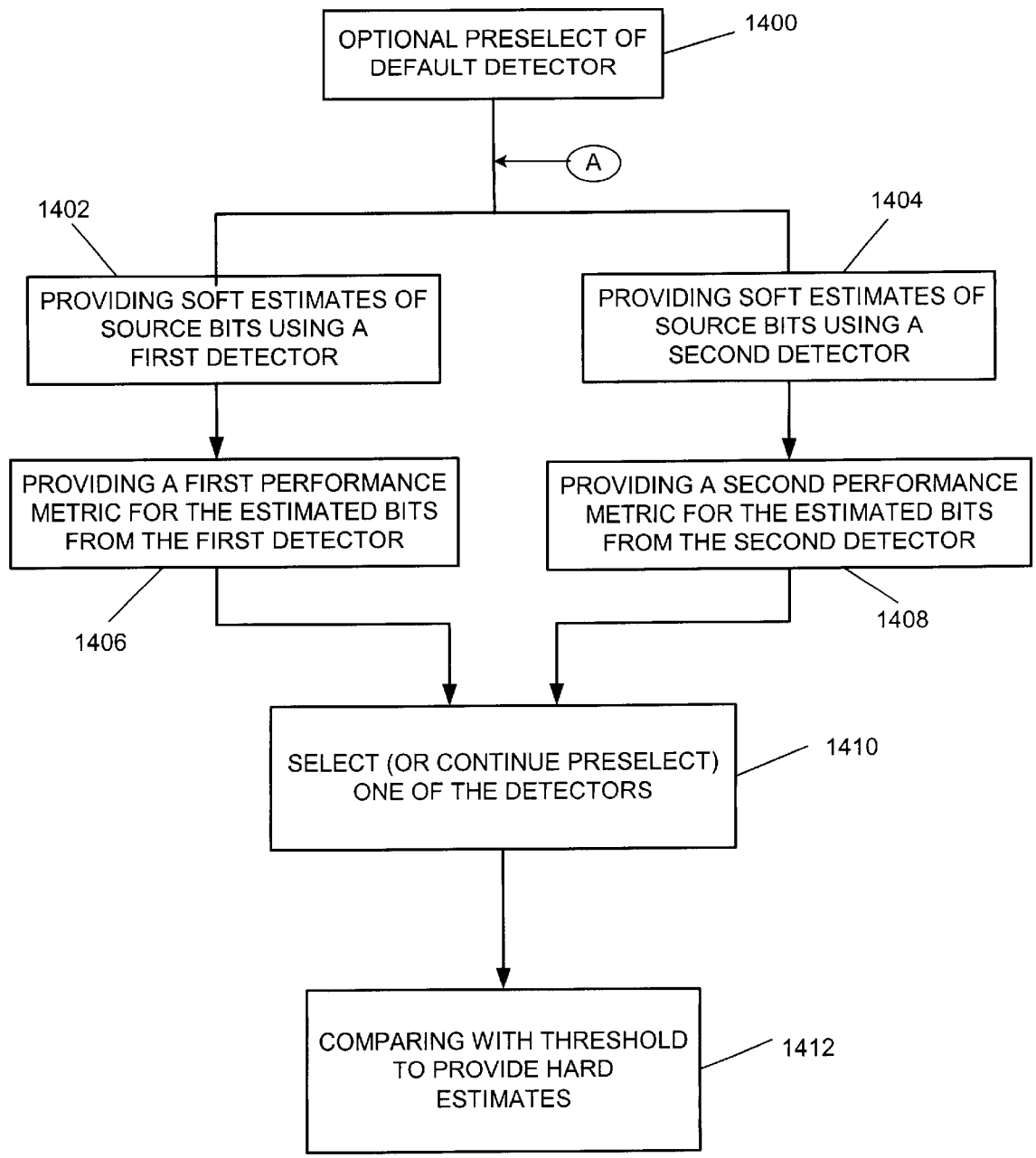
FIG. 14 is a flowchart illustrating a method of operation of the first embodiment of a demodulation system according to the invention.

A method of operation for this first embodiment of a demodulation system is illustrated in FIG. 14. In optional step 1400, a default detector is preselected for system output. Step 1400 is followed by steps 1402 and 1404, which are performed in parallel. In step 1402, soft estimates of the source bits are provided by a first detector. The detector may estimate the source bits by operating on a particular baseband signal. In step 1404, soft estimates of the source bits are provided using a second detector. The second detector may estimate the source bits from the same baseband signal operated on by the first detector. The first and second detectors may be such that at least one of the detectors is better able than the other to handle a particular form of interference, such as ACI, CCI, or ISI.

Step 1402 is followed by step 1406, where a performance metric is provided for the soft estimates from the first detector. The performance metric may be an absolute metric, based on comparison to an absolute standard, or it may be a relative metric, based on a comparison with performance metrics from other detectors.

Step 1404 is followed by step 1408, where a performance metric is provided for the soft estimates from the second detector. Again, the performance metric may be an absolute or a relative metric.

Steps 1406 and 1408 are followed by step 1410, where one of the first and second detectors is selected (or the pre-selection of the default detector is confirmed) responsive to consideration of one or more of the first and second performance metrics.

Step 1410 is followed by step 1412, where the soft estimates from the selected detector are used to provide hard estimates. This may occur by comparing the soft estimates with a predetermined threshold as previously discussed.

At this point, the method may iterate one or more times by looping back to point A, and then continuing the method from that point forward.

The foregoing method is described in relation to first and second detectors for ease of illustration only. One of ordinary skill in the art will appreciate from a reading of this disclosure that the method can readily be applied to cases involving more than two detectors. In addition, the detectors in the foregoing embodiment are described as producing soft estimates of the underlying source bits. One of ordinary skill in the art will appreciate from a reading of this disclosure that embodiments are possible where the detectors produce hard estimates, and the comparing step 1412 is eliminated given that it is implicitly performed by the detectors.

Figure 15:
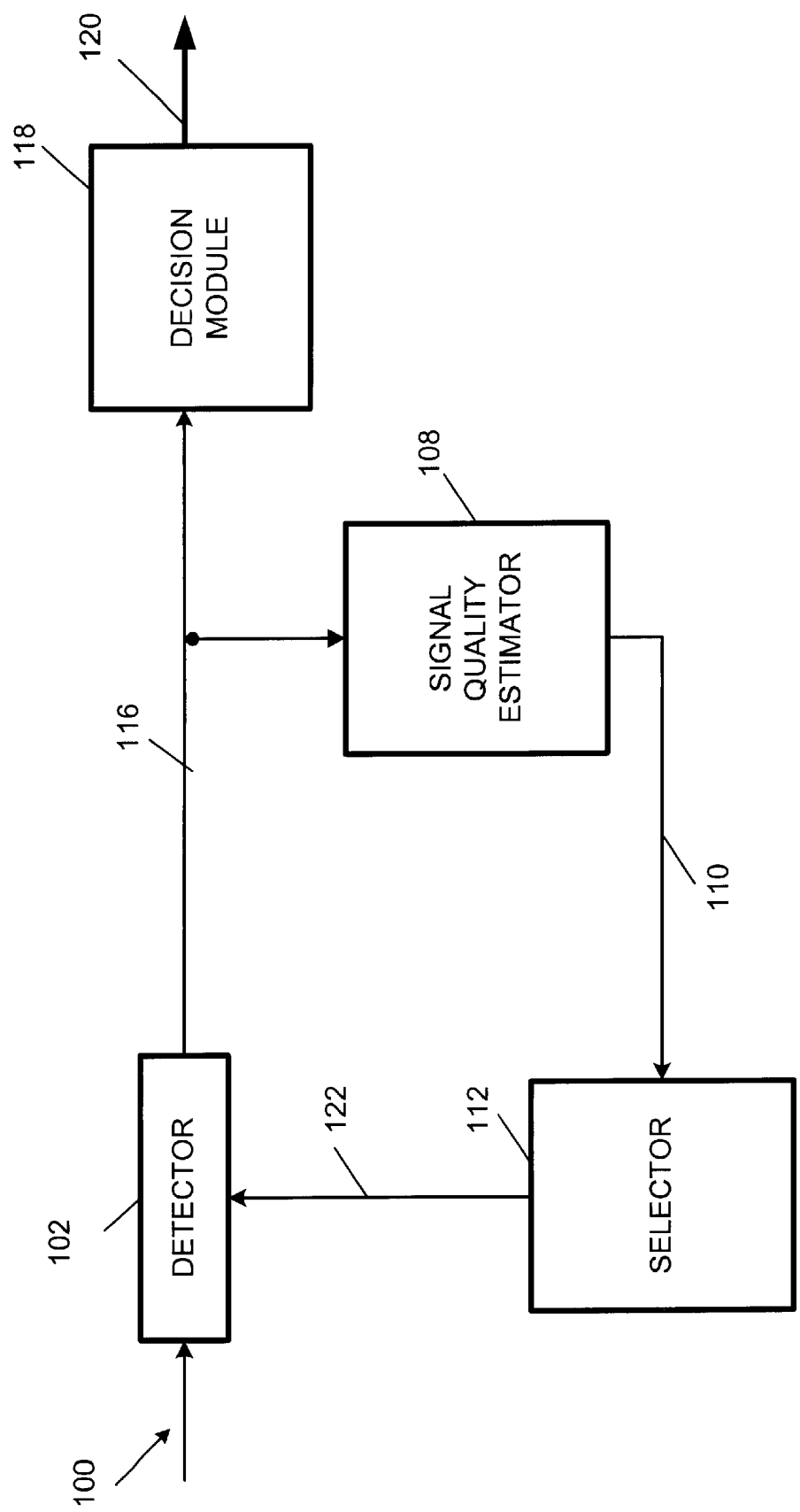
FIG. 15 is a block diagram of a second embodiment of a demodulation system according to the invention.

A second embodiment of a GFSK demodulation system is illustrated in FIG. 15. As illustrated, a baseband signal 100 is input to a detector 102 which is configurable responsive to one or more control signals 118 provided by the selector 112. At least one of the possible modes of operation may be better able than one or more of the other modes to handle a particular form of interference.

For example, the detector 102 may be a differential phase detector where the delay between the sampling of successive values of θ is a variable which is set responsive to the one or more control signals 122. The detector 102 may initially be configured to utilize a default delay. During a prescribed time period, the signal 114 output by the detector 102 may be provided to the signal quality estimator 108. The signal quality estimator 108 may then provide, over signal line 110, one or more performance metrics for the signal. The selector 112 may then select a delay (or confirm a default delay) for the detector 102 responsive to the one or more performance metrics. The selector 112 may then provide one or more control signals 122 to the detector 102 advising it of the selected or pre-selected delay. Responsive to these control signals, the detector 102 reconfigures itself (or confirms a default configuration) so that it utilizes the selected or pre-selected delay in its operation.

Figure 16:
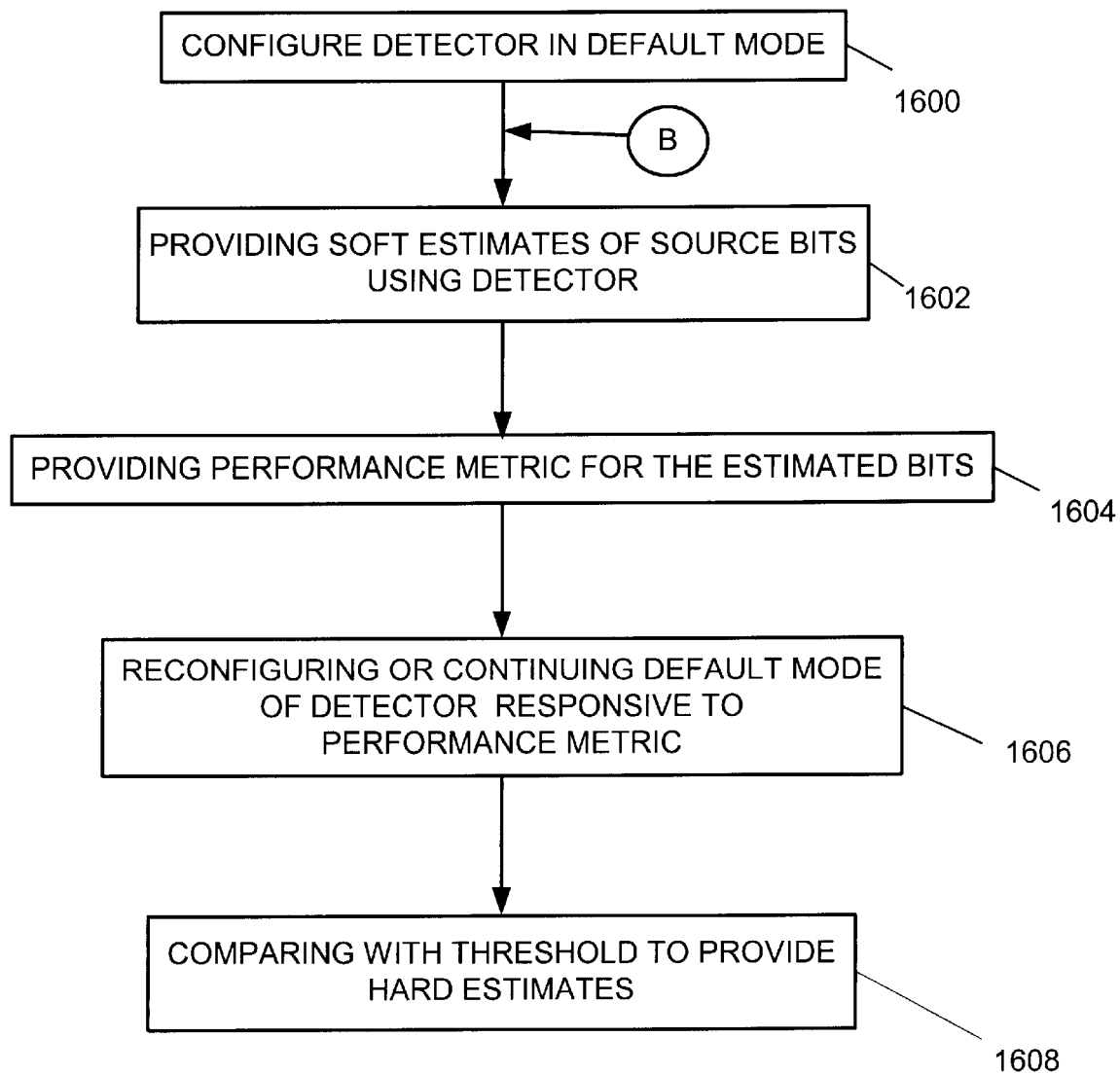
FIG. 16 is a flowchart illustrating a method of operation of the second embodiment of a demodulation system according to the invention.

A method of operation for this second embodiment of a demodulation system is illustrated in FIG. 16. In step 1600, a detector is placed in a default mode of operation. The default mode is selected from a plurality of possible modes of operation. One or more of the modes may be better than the other modes of handling a particular form of interference. Step 1600 is followed by step 1602, where soft estimates of the source bits are provided using the default detector. Step 1602 is followed by step 1604, where a performance metric is provided for the soft estimates from the detector. The performance metric may be an absolute metric, based on comparison to an absolute standard, or it may be a relative metric, based on a comparison with performance metrics from other detectors.

Step 1604 is followed by step 1606, where the detector is reconfigured into a different mode (or the default mode is confirmed), responsive to consideration of the performance metric.

Step 1606 is followed by Step 1608, where the soft estimates from the detector are compared with a predetermined threshold in the manner previously described to produce hard estimates for the source bits.

At this point, the method may iterate one or more times by looping back to point B, and then continuing the method from that point forward.

Again, the embodiment is described in terms of the detector producing soft estimates of the underlying source bits. One of ordinary skill in the art will appreciate from a reading of this disclosure that embodiments are possible where the detector produces hard estimates of the underlying source bits, and the comparing step 1608 is eliminated, given that it is implicitly performed by the detector.

Figure 17:
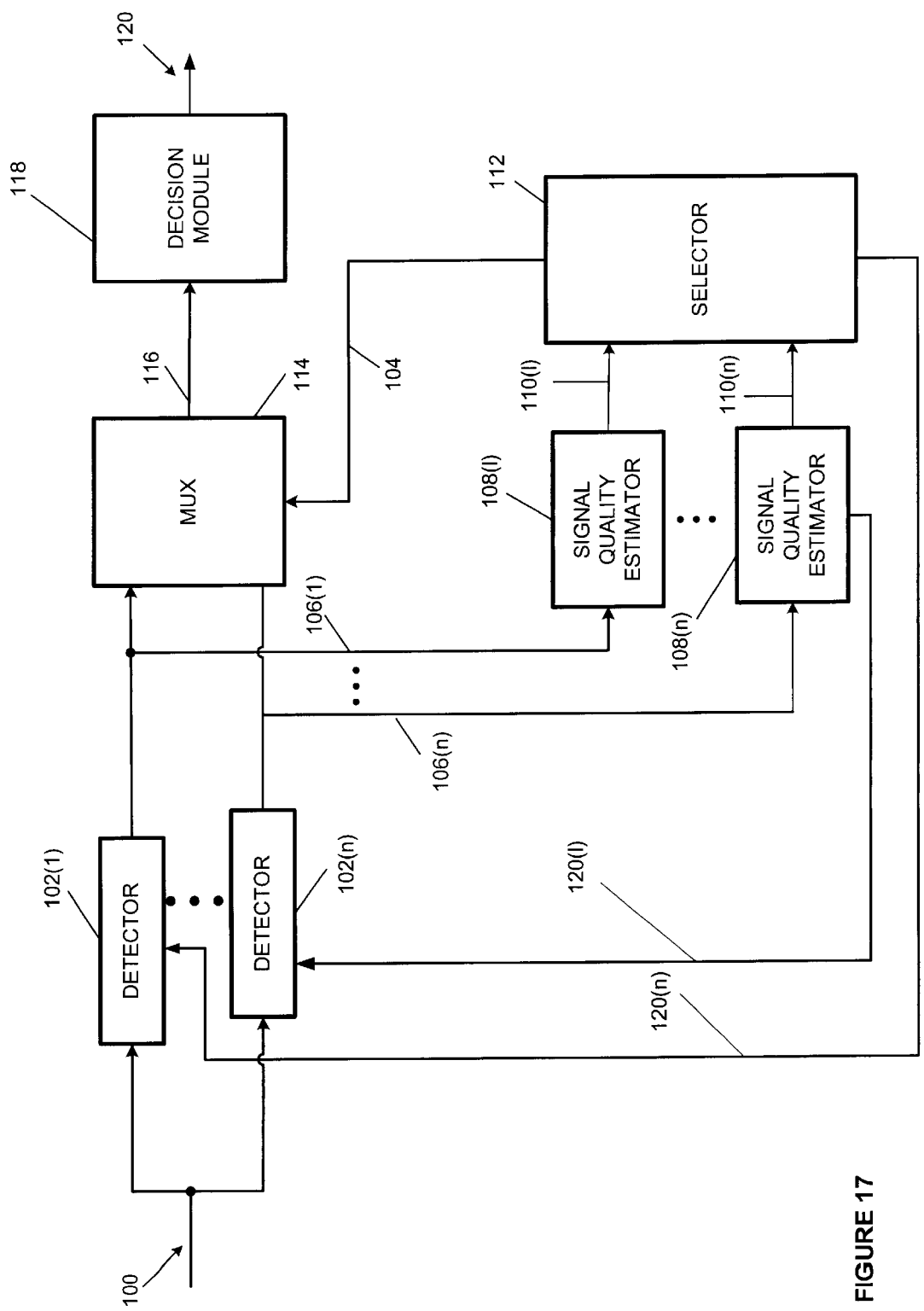
FIG. 17 is a block diagram of a third embodiment of a demodulation system according to the invention.

A third embodiment of a GFSK demodulation system is illustrated in FIG. 17. In this embodiment, the system is a combination of the first two embodiments. In particular, a baseband signal 100 is input into a plurality of detectors 102(1), 102(n). As before, for ease of illustration, only two such detectors are expressly shown in FIG. 17, but it should be appreciated that this embodiment covers the case where an arbitrary number n of detectors is included, n being an integer greater than or equal to 1.

At least one of the detectors 102(1), 102(n) may be configured to better handle a particular form of interference than one or more of the other detectors. Each of the detectors 102(1), 102(n) functions to detect the information in the baseband signal 100, and output a signal embodying that information. The outputs 106(1), 106(n) of the detectors are coupled in parallel to respective signal quality estimators 108(1), 108(n) and to the parallel data inputs of multiplexor 114. The signal quality estimators 108(1), 108(n) may provide performance metrics for the signals output by the detectors. Each performance metric provides a measure of the quality of the corresponding detector output. The performance metric for a signal may be based on a relative comparison between the signal and other signals output from one or more of the detectors, or it may be an absolute measurement based on a comparison of the signal to an absolute standard. The performance metric for a signal may even change over time or responsive to channel conditions.

The performance metrics are provided to selector 112 over signal lines 110(1), 110(n). Responsive to the one or more performance metrics, the selector 112 may set the state of one or more signal lines 104. These signal lines are coupled to the control input of multiplexor 114. Responsive to the setting of these control inputs, the multiplexor 114 routes(or continues the previous routing of) one of the detector outputs to its output 116.

The output 116 of the multiplexor is input to decision module 118 which provides hard estimates of the underlying source bits in the manner previously described.

One or more of the detectors 102(1), 102(n) may also be configurable responsive to one or more control signals 120(1), 120(n) provided by the selector 112. At least one of the possible modes of operation in a detector may be better able than one or more of the other modes to handle a particular form of interference.

For example, a baseband signal may be input to a differential phase detector and a FM detector. The differential phase detector may have a variable delay between successive values of θ which is configurable responsive to channel conditions. The delay may initially be set to a default value, and changed over time responsive to channel conditions.

Signals embodying estimated bits from the two detectors are routed to respective signal quality estimators 108(1), 108(n) which produces one or more performance metrics for each of these signals. These performance metrics are provided to selector 112, which selects one of the detectors based on the performance metrics. The selector 112 communicates its selection to the multiplexor through one or more signal lines 104. Responsive thereto, the multiplexor 114 selects (or continues the pre-selection of) one of the detectors for output on signal line 116.

The selector 112 may also select or continue the pre-selection of, responsive to the performance metric of the selected detector, a mode of operation for the selected detector. It may then communicate that selection/pre-selection to the appropriate detector through one or more signal lines 120(1), 120(n). This mode selection procedure may occur at the same or a different time than the detector selection procedure. Responsive thereto, the selected detector may reconfigure itself to the selected mode of operation. If the selected detector is already in the selected mode through default or the like, the selected detector is allowed to continue operating in the selected mode.

Again, one of ordinary skill in the art will appreciate from a reading of this disclosure that embodiments are possible where an arbitrary number of detectors are provided, where n is an integer greater than 1. One of ordinary skill in the art will also appreciate that embodiments are possible where the detectors provide hard estimates of the underlying source bits. Consequently, in these latter embodiments, the decision module 118 can be eliminated, given that its function is implicitly performed by the detectors.

Figure 18:
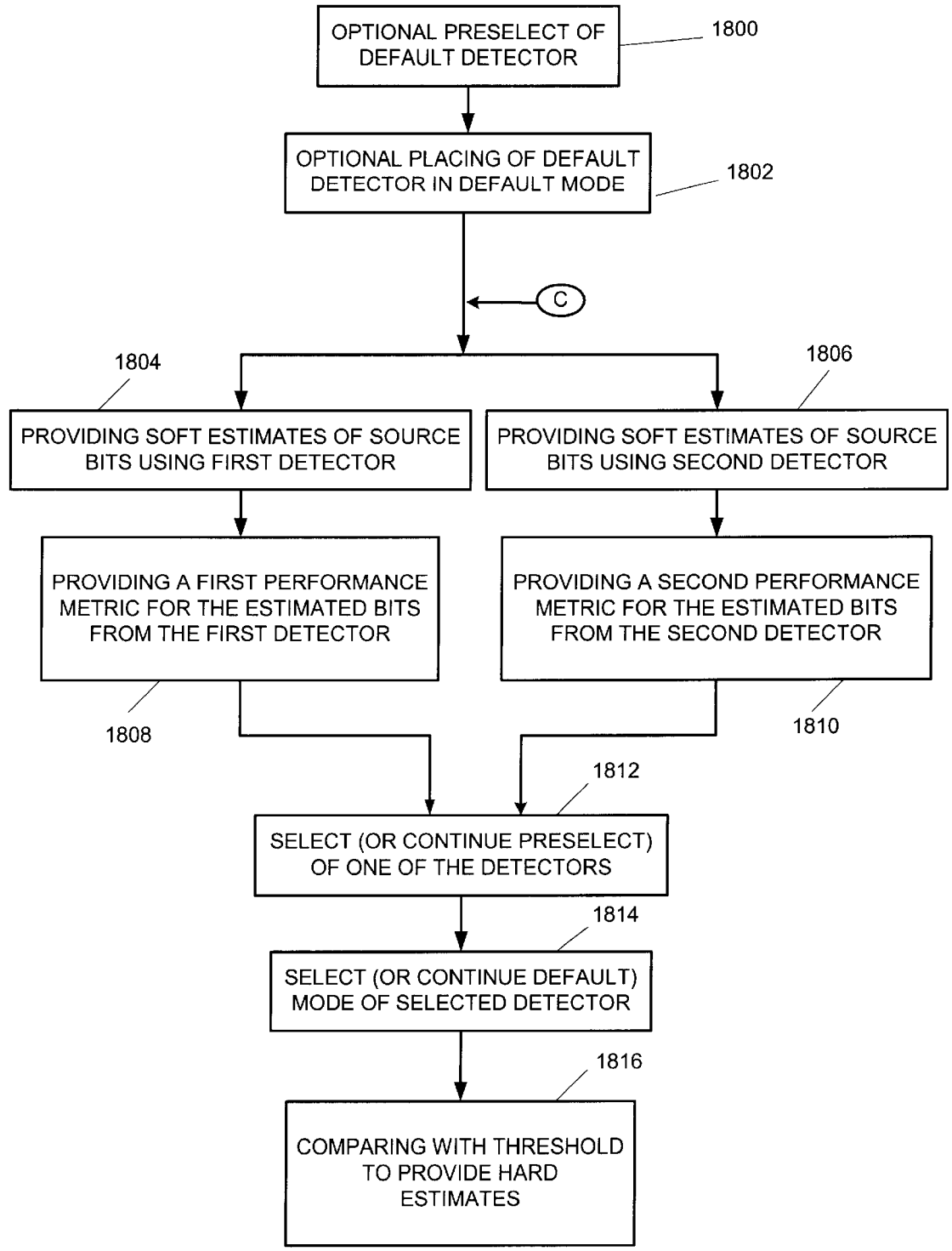
FIG. 18 is a flowchart illustrating a method of operation of the third embodiment of a demodulation system according to the invention.

A method of operation for this third embodiment of a demodulation system is illustrated in FIG. 18. In optional step 1800, a default detector is preselected for system output, and the default detector is placed in a default mode of operation. Step 1800 is followed by step 1802, where the selected detector is placed in a default mode of operation.

Step 1802 is followed by steps 1804 and 1806, which are performed in parallel. In step 1804, soft estimates of the source bits are provided using a first detector. The detector may estimate the source bits by operating on a particular baseband signal. In step 1806, soft estimates of the source bits are provided using a second detector. The second detector may estimate the source bits from the same baseband signal operated on by the first detector.

Step 1804 is followed by step 1808, where a performance metric is provided for the soft estimates from the first detector. The performance metric may be an absolute metric, based on comparison to an absolute standard, or it may be a relative metric, based on a comparison with performance metrics from other detectors.

Step 1806 is followed by step 1810, where a performance metric is provided for the estimated bits from the second detector. Again, the performance metric may be an absolute or a relative metric.

Step 1808 and 1810 are followed by step 1812, where one of the first and second detectors is selected, or continued to be selected, responsive to consideration of one or more of the first and second performance metrics.

Step 1812 is followed by step 1814, where the selected detector is either reconfigured into a different mode, or the pre-existing mode is continued, responsive to consideration of the performance metric for that detector. The performance metric used to perform this step may be one of the values determined in steps 1808 or 1810, and may be an updated version of one of these values based on subsequent additional soft estimates provided by the detector.

Step 1814 is followed by step 1816, where the soft estimates from the selected detector are compared with a predetermined threshold to provide hard estimates of the underlying source bits in the manner previously described.

At this point, the method may iterate one or more times by looping back to point C, and then continuing the method from that point forward.

Again, one of ordinary skill in the art will appreciate from a reading of this disclosure that embodiments are possible where an arbitrary number of detectors are indicated, where n is an integer greater than 1. One of ordinary skill in the art will also appreciate that embodiments are possible, where the detectors provide hard estimates of the underlying source bits. Consequently, in these latter embodiments, the comparing step 1816 can be eliminated, given that it is implicitly performed by the detectors.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A demodulation system comprising:
   a plurality of detectors, each configured to estimate source bits from a common signal;
   one or more signal quality estimators for receiving signals embodying the estimated bits from the detectors, and determining one or more performance metrics for the detectors;
   a selector for receiving the one or more performance metrics from the one or more signal quality estimators, and, responsive thereto, selecting or continuing the pre-selection of one of the detectors; and
   a multiplexor configured to receive signals embodying estimated bits from the detectors, and, responsive to the selection or pre-selection made by the selector, outputting the estimated bits from one of the detectors, wherein the detectors are configured to provide soft estimates of the source bits, and the system further comprises a decision module configured to provide hard estimates of the source bits from the output of the multiplexor.

2. The system of claim 1 wherein one of the detectors is a differential phase detector and another is an FM detector.

3. The system of claim 1 wherein one of the detectors is a differential phase detector and another is a different type of differential phase detector.

4. The system of claim 3 wherein one of the detectors is a 1 bit differential phase detector and another is a 0.25 bit differential phase detector.

5. The system of claim 1 wherein the estimated bits from the detectors are provided in parallel to a plurality of signal quality estimators.

6. A method of demodulating a signal comprising the steps of:
estimating source bits from the signal using a first detector;
estimating source bits from the signal using a second detector;
providing a first performance metric for the estimated bits from the first detector;
providing a second performance metric for the estimated bits from the second detector;
selecting, or continuing the pre-selection of, one of the detectors responsive to the first and second performance metrics;
outputting soft estimates of the source bits from the selected or pre-selected detector;
comparing the soft estimates to a predetermined threshold to produce hard estimates of the source bits; and
outputting the hard estimated bits.

7. The method of claim 6 further comprising performing the first and second providing steps in parallel.

8. The method of claim 6 further comprising performing the first and second estimating steps in parallel.

9. The method of claim 6 further comprising iterating through the first and second estimating steps, the first and second providing steps, and the selecting steps, one or more times.

10. The method of claim 6 further comprising preselecting one of the detectors as a default detector.

11. The method of claim 6 further comprising outputting hard estimates of the source bits from the selected or pre-selected detector.

12. The method of claim 6 further comprising performing the two estimating steps, the two providing steps, and the selecting step during a first time period, and performing the outputting step during a second time period.

13. The method of claim 12 wherein the first and second time periods are successful time periods.

14. The method of claim 6 wherein the first detector is a differential phase detector and the second detector is an FM detector.

15. The method of claim 6 wherein the first and second detectors are differential phase detectors of different types.

16. The method of claim 15 wherein the first detector is a 1 bit differential phase detector and the second detector is a 0.25 bit differential phase detector.

17. A demodulation system comprising:
a detector for estimating source bits from a signal, and providing the estimated source bits to an output, the detector having a plurality of possible operating modes, and configurable to operate in accordance with one of the modes;
a signal quality estimator for receiving the estimated source bits, and producing one or more performance metrics for the estimated bits; and
a selector for receiving the one or more performance metrics, and selecting, or continuing the pre-selection of, one of the operating modes of the detector responsive to the one or more performance metrics;
wherein the detector is configured to operate, or continue operating, in accordance with the mode of operation selected or pre-selected by the selector.

18. The system of claim 17 wherein the detector is a differential phase detector having a variable delay between successful samples of $\theta$, which is configurable responsive to the selector.

19. The system of claim 17 wherein the detector has a default mode of operation which is changed based on channel conditions.

20. The system of claim 17 wherein the estimates from the detector are soft estimates, and the system further comprises a decision module for providing hard estimates of the source bits from the soft estimates.

21. A method of demodulating a signal comprising the steps of:
providing a detector having a plurality of possible operating modes;
placing the detector in a default mode of operation;
using the detector to estimate source bits from the signal;
providing one or more performance metrics for the estimated bits;
selecting, or continuing the pre-selection of, a mode of operation for the detector responsive to the one or more performance metrics; and
operating the detector in accordance with the selected or pre-selected mode of operation;
wherein the detector is a differential phase detector having a variable delay between successive samples of phase angle, further comprising setting the variable delay responsive to the selected mode of operation.

22. The method of claim 21 further comprising iterating through the using, providing, selecting, and setting steps one or more times.

23. The method of claim 21 further comprising outputting the estimated bits from the detector.

24. The method of claim 21 wherein the estimates from the detector are soft estimates, and the method further comprises comparing the soft estimates with a predetermined threshold to provide hard estimates of the source bits.

25. A demodulation system comprising:
a plurality of detectors, each configured to estimate source bits from a common signal;
one or more signal quality estimators for receiving signals embodying the estimated bits from the detectors, and determining one or more performance metrics for the detectors;
a selector for receiving the one or more performance metrics from the one or more signal quality estimators, and, responsive thereto, selecting or continuing the pre-selection of one of the detectors; and
a multiplexor configured to receive signals embodying estimated bits from the detectors, and, responsive to the selection or pre-selection made by the selector, outputting the estimated bits from one of the detectors, wherein the selected detector has a plurality of possible modes of operation, wherein the selector is configured to select one or more of the modes responsive to one or more performance metrics for the signal output by the detector, and wherein the detector is configured to operate in accordance with the selected mode.

26. A method of demodulating a signal comprising the steps of:

estimating source bits from the signal using a first detector;

estimating source bits from the signal using a second detector;

providing a first performance metric for the estimated bits from the first detector;

providing a second performance metric for the estimated bits from the second detector;

selecting, or continuing the pre-selection of, one of the detectors responsive to the first and second performance metrics, wherein the selected detector has a plurality of possible operating modes, the method further comprising selecting one of the operating modes responsive to one or more performance metrics, and operating the detector in accordance with the selected mode of operation.

27. A demodulation system comprising:

first and second detection means, each configured to estimate source bits from a common signal;

signal quality estimation means for receiving the estimates from the first and second detection means, and determining performance metrics for the estimates;

selection means for receiving the performance metrics from the signal quality estimation means, and, responsive thereto, selecting or pre-selecting one of the detection means; and multiplexing means configured to receive the estimates from the detection means, and responsive to the selection or pre-selection made by the selection means, selecting, or continuing the pre-selection of, one of the detection means;

wherein the estimates from the detection means are soft estimates, and the system further comprises decision means for providing hard estimates of the source bits responsive to the soft estimates output by the multiplexing means.

* * * * *